(12) United States Patent
Peng et al.

(10) Patent No.: US 7,929,759 B2
(45) Date of Patent: Apr. 19, 2011

(54) METHOD AND DEVICE FOR RECONSTRUCTING MISSING COLOR COMPONENT OF PIXEL

(75) Inventors: Chi Feng Peng, Taipei (TW); Chiou Yuan Lai, Taoyuan (TW)

(73) Assignee: Mstar Semiconductor, Inc., Hsinchu hsien (TW)

( * ) Notice: Subject to any disclaimer, the term of this patent is extended or adjusted under 35 U.S.C. 154(b) by 1112 days.

(21) Appl. No.: 11/670,768

(22) Filed: Feb. 2, 2007

(65) Prior Publication Data

US 2008/0055619 A1 Mar. 6, 2008

(30) Foreign Application Priority Data

Sep. 1, 2006 (TW) .................................. 95132486

(51) Int. Cl.
*G06K 9/00* (2006.01)
(52) U.S. Cl. ...................... 382/167; 348/222.1; 348/273
(58) Field of Classification Search .......... 382/162–167, 382/299, 300; 348/222.1, 237
See application file for complete search history.

(56) References Cited

U.S. PATENT DOCUMENTS

| 3,971,065 | A | 7/1976 | Bayer |
| 5,629,734 | A | 5/1997 | Hamilton, Jr. et al. |
| 7,158,685 | B2 * | 1/2007 | Guenter ........................ 382/261 |
| 7,324,707 | B2 | 1/2008 | Huang et al. |
| 2006/0198556 | A1 * | 9/2006 | Chen et al. ..................... 382/162 |

FOREIGN PATENT DOCUMENTS

| TW | I246851 | 1/2006 |
| TW | I255550 | 5/2006 |

* cited by examiner

*Primary Examiner* — Bhavesh M Mehta
*Assistant Examiner* — Sean Motsinger (57) ABSTRACT

Missing color data of a specified pixel of a Bayer pattern is reconstructed with a plurality of interpolation algorithms. A vertical color data difference index Cv and a horizontal color data difference index Ch are first measured according to color data of a first group of pixels included in a pixel array, wherein the first group of pixels include a plurality of pixels vertically adjacent to the specified pixel, a plurality of pixels horizontally adjacent to the specified pixel, and at least one other pixel non-vertical and non-horizontal to the specified pixel. Then, one of a plurality of preset interpolation algorithms is selected according to a comparing result of the vertical color data difference index Cv and horizontal color data difference index Ch, and executed to obtain a reconstructed color data of the specified pixel.

17 Claims, 5 Drawing Sheets

| P1  | P2  | P3  | P4  | P5  |
|-----|-----|-----|-----|-----|
| R1  | G2  | R3  | G4  | R5  |
| P6  | P7  | P8  | P9  | P10 |
| G6  | B7  | G8  | B9  | G10 |
| P11 | P12 | P13 | P14 | P15 |
| R11 | G12 | R13 | G14 | R15 |
| P16 | P17 | P18 | P19 | P20 |
| G16 | B17 | G18 | B19 | G20 |
| P21 | P22 | P23 | P24 | P25 |
| R21 | G22 | R23 | G24 | R25 |

FIG.3A

| P1  | P2  | P3  | P4  | P5  |
|-----|-----|-----|-----|-----|
| B1  | G2  | B3  | G4  | B5  |
| P6  | P7  | P8  | P9  | P10 |
| G6  | R7  | G8  | R9  | G10 |
| P11 | P12 | P13 | P14 | P15 |
| B11 | G12 | B13 | G14 | B15 |
| P16 | P17 | P18 | P19 | P20 |
| G16 | R17 | G18 | R19 | G20 |
| P21 | P22 | P23 | P24 | P25 |
| B21 | G22 | B23 | G24 | B25 |

FIG.3B

| P1  | P2  | P3  | P4  | P5  |
|-----|-----|-----|-----|-----|
| G1  | R2  | G3  | R4  | G5  |
| P6  | P7  | P8  | P9  | P10 |
| B6  | G7  | B8  | G9  | B10 |
| P11 | P12 | P13 | P14 | P15 |
| G11 | R12 | G13 | R14 | G15 |
| P16 | P17 | P18 | P19 | P20 |
| B16 | G17 | B18 | G19 | B20 |
| P21 | P22 | P23 | P24 | P25 |
| G21 | R22 | G23 | R24 | G25 |

METHOD AND DEVICE FOR RECONSTRUCTING MISSING COLOR COMPONENT OF PIXEL

FIELD OF THE INVENTION

The present invention relates to method and device for reconstructing a missing color component of a pixel, and more particularly to method and device for reconstructing a missing color component of a pixel for a Bayer pattern pixel array.

BACKGROUND OF THE INVENTION

Nowadays, digital cameras with CCD or CMOS sensors to take pictures have overtopped traditional cameras that use films to retain images and become commercial mainstream. As the CCD or CMOS sensors can only distinguish light intensities other than color differences, a color filter, also referred to as CF, is generally required in front of the CCD or CMOS sensors for color correction.

The color filter filters colors according to three primary colors, including R (red), G (green) and B (blue). Therefore, three CCD elements are required for the same position for capturing RGB data. The color data obtained by the three CCD elements are then mixed to realize a full-color pixel. Due to cost and size considerations, however, the RGB data are not simultaneously picked up for most digital cameras, and instead, only one of the RGB data is sensed at the same position while giving up the other two color data.

Despite some color components are given up for reducing cost and device size, it is preferred to reconstruct the color data to some extent so as to improve image quality. Please refer to FIG. 1, which illustrates a color filter array (CIA) commonly used in a digital camera. Each block in the diagram represents a pixel of a CCD. As shown, the G, B and R pixel numbers are in a ratio of 2:1:1. Such distribution is so-called as a Bayer pattern. The details of a Bayer pattern, for example, can be realized from U.S. Pat. No. 3,971,065, which is incorporated herein for reference. By interpolating the color data obtained by the combination of CFA and CCD, the color data of lost components can be mathematically reconstructed.

A variety of interpolation algorithms can be applied to this field to reconstruct color data. One of the algorithms is constant interpolation such as "nearest interpolation", "bilinear interpolation", "smooth hue transition", etc. According to the constant interpolation algorithm, the pixels selected for calculating color data of a specified pixel are located at fixed positions relative to the specified pixel. If the specified pixel is an edge point, pixel(s) beyond the edge will be incorporated for determining the color data of the specified pixel, which might result in a blurred edge.

Figure 1:
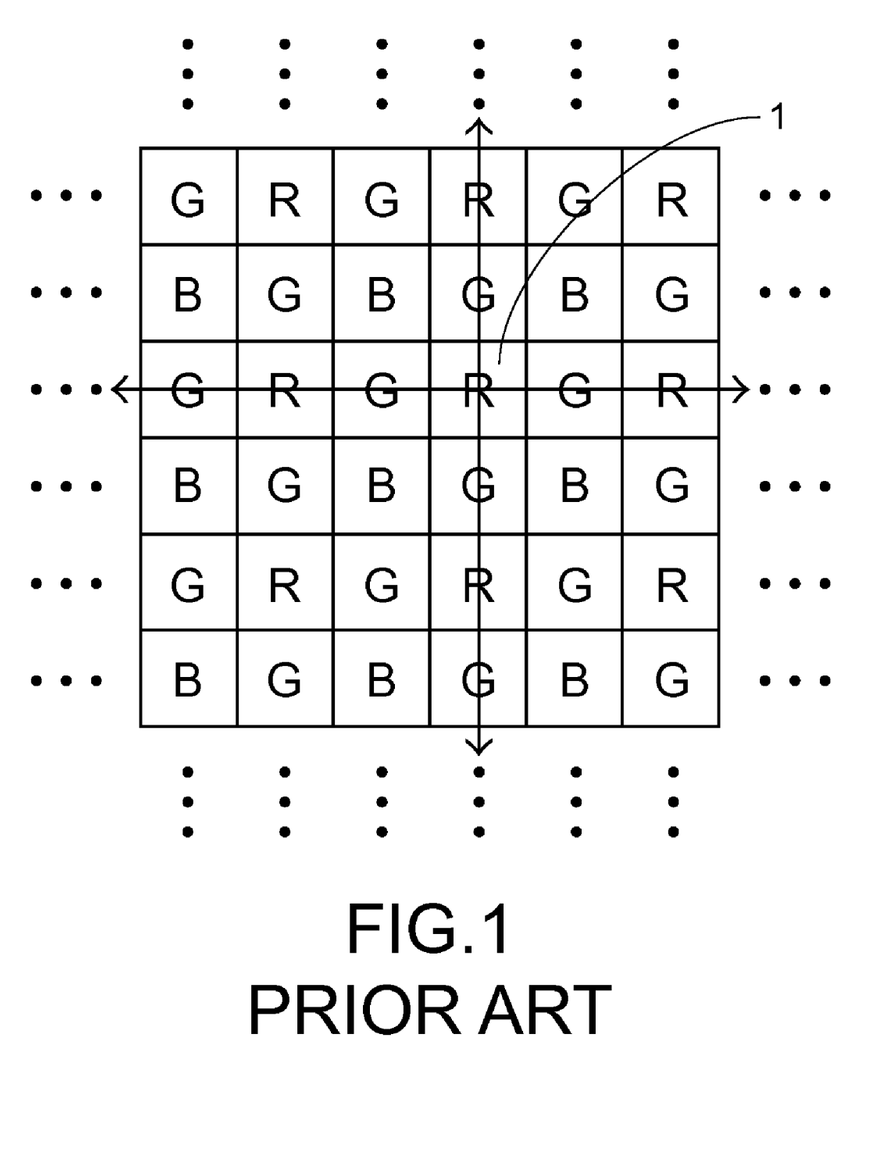
FIG. 1 is a schematic diagram illustrating a Bayer pattern and a conventional method for reconstructing missing color data.

A non-constant interpolation algorithm instead of constant interpolation algorithm is also developed. As the term "non-constant" means, distances from the pixels selected for determining the color data to a specified pixel in such an interpolation algorithm are not constant. The non-constant interpolation algorithm takes edges into consideration to lower an effect of blurred edges, as described in U.S. Pat. No. 5,629,734, which is incorporated herein for reference. However, in the prior art, the selected pixels are always in the same row and the same column (see arrows) as the specified pixel 1, as shown in FIG. 1. Therefore, the blurred edge problem can only be ameliorated in limited cases, and the reconstructed image quality is still far from satisfaction.

SUMMARY OF THE INVENTION

Therefore, the present invention provides method and device for reconstructing missing color data with improved image quality.

According to an aspect of the present invention, a method for reconstructing a color data of a specified pixel includes: measuring a vertical color data difference index Cv and a horizontal color data difference index Ch according to color data of a first group of pixels included in a pixel array, wherein the first group of pixels include a plurality of pixels vertically adjacent to the specified pixel, a plurality of pixels horizontally adjacent to the specified pixel, and at least one other pixel non-vertical and non-horizontal to the specified pixel; and executing one of a plurality of preset interpolation algorithms, which is selected according to a comparing result of the vertical color data difference index Cv and horizontal color data difference index Ch, thereby obtaining a reconstructed color data.

In an embodiment, the specified pixel is one of the pixels included in a Bayer pattern, the specified pixel contains first-component color data while missing second-component color data and third-component color data, pixels vertically and horizontally next to the specified pixel contain the second-component color data, and pixels orthogonally next to the specified pixel contain the third-component color data.

In an embodiment, the reconstructed color data is the second-component color data. A first interpolation algorithm is executed with a second group of pixels of the pixel array if $Cv-Ch<T$, where T is a preset threshold equal to or greater than zero, a second interpolation algorithm is executed with a third group of pixels of the pixel array if $Cv-Ch>T$, and a third interpolation algorithm is executed with a fourth group of pixels of the pixel array if $Cv-Ch=T$.

In an embodiment, the second group of pixels includes all the pixels in the same column of the pixel array as the specified pixel and at least one other pixel.

In an embodiment, the third group of pixels includes all the pixels in the same row of the pixel array as the specified pixel and at least one other pixel.

In an embodiment, the fourth group of pixels essentially consists of pixels horizontally and vertically next to the specified pixel.

In an embodiment, the first interpolation algorithm, the second interpolation algorithm and the third interpolation algorithm are based on minimum color difference theory.

According to another aspect of the present invention, a device for reconstructing a color data of a specified pixel included in a Bayer pattern, which comprises: a minimum color difference estimator for measuring a vertical color data difference index Cv and a horizontal color data difference index Ch specific to the specified pixel according to color data of a specified group of pixels included in the Bayer pattern; a comparing and discriminating device coupled to the minimum color difference estimator for comparing the vertical color data difference index Cv with the horizontal color data difference index Ch, and selecting one of a plurality of preset interpolation algorithms to be executed according to the comparing result; and a color data operator coupled to the comparing and discriminating device for executing the selected interpolation algorithm with color data of a selected group of pixels included in the Bayer pattern, thereby obtaining a reconstructed color data of the specified pixel.

In an embodiment, the device further includes a storage device coupled to the minimum color difference estimator and the color data operator for storing therein the Bayer pattern and being written thereinto the reconstructed color data of the specified pixel.

In an embodiment, the comparing and discriminating device issues a first signal indicative of Cv−Ch<T, a second signal indicative of Cv−Ch>T or a third signal indicative of Cv−Ch=T to the color data operator to have a first interpolation algorithm, a second interpolation algorithm or a third interpolation algorithm executed, respectively.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

For precisely reconstructing missing color data of a specified pixel so as to improve image quality, the present invention differentiates the interpolation algorithms according to color data conditions around the specified pixel.

Figure 2:
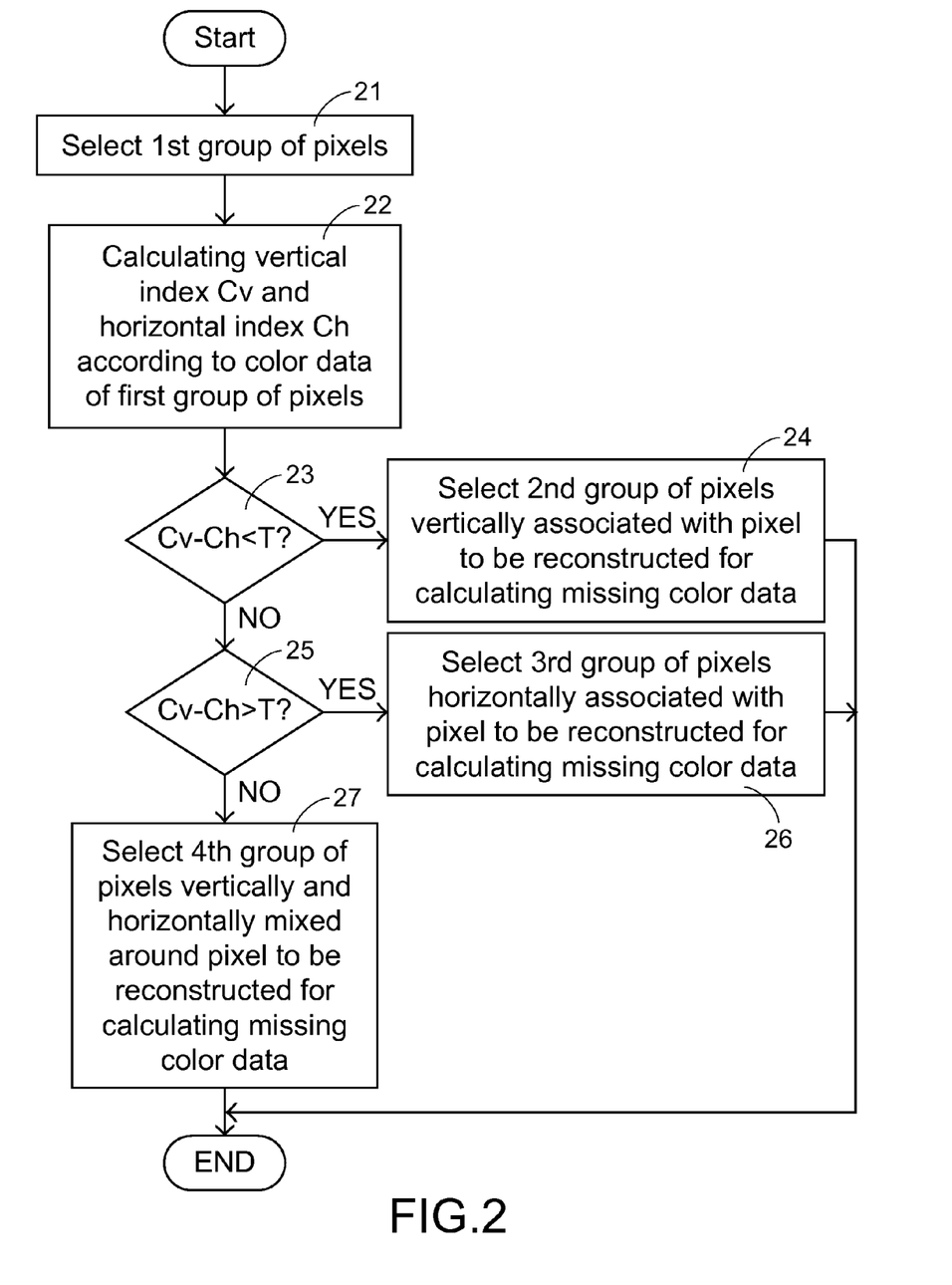
FIG. 2 is a flowchart illustrating a method for reconstructing missing color data according to an embodiment of the present invention.

Please refer to FIG. 2, which is a flowchart illustrating an embodiment of the present invention. In this embodiment, a first group of pixels around the specified pixel are selected (Step 21), and the color data of the first group of pixels are used to obtain a vertical color data difference index Cv and a horizontal color data difference index Ch (Step 22). If the index Cv is smaller than the index Ch and does not exceed the index Ch to a certain extent, i.e. Cv−Ch<T, where T is a preset threshold (Step S23), which means the color changes less significantly in the vertical direction than in the horizontal direction, a first interpolation algorithm will be executed with a second group of pixels vertically adjacent to the specified pixel (Step 24). On the other hand, if the index Cv is greater than the index Ch to the certain extent, i.e. Cv−Ch>T (Step S25), which means the color changes less significantly in the horizontal direction than in the vertical direction, a second interpolation algorithm will be executed with a third group of pixels horizontally adjacent to the specified pixel (Step 26). Otherwise, i.e. the index Cv is substantially equal to or approximates to the index Ch, it means the color changes evenly in the horizontal direction and in the vertical direction.

Then, a third interpolation algorithm will be executed with a fourth group of pixels vertically and horizontally around the specified pixel (Step 27).

Figure 3A:
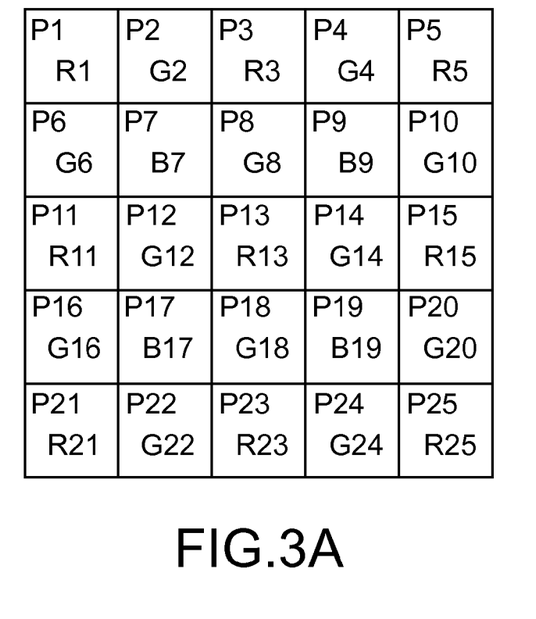
FIG. 3A is a schematic diagram illustrating a Bayer pattern with a red center pixel to be reconstructed with missing green and blue color data.
Figure 3B:
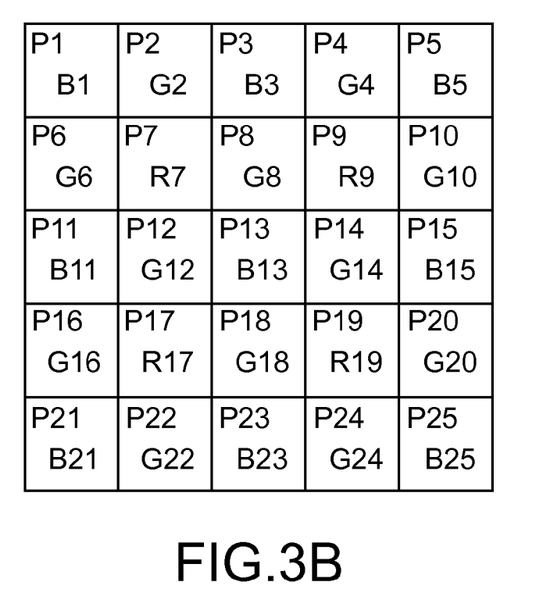
FIG. 3B is a schematic diagram illustrating a Bayer pattern with a blue center pixel to be reconstructed with missing green and red color data.
Figure 3C:
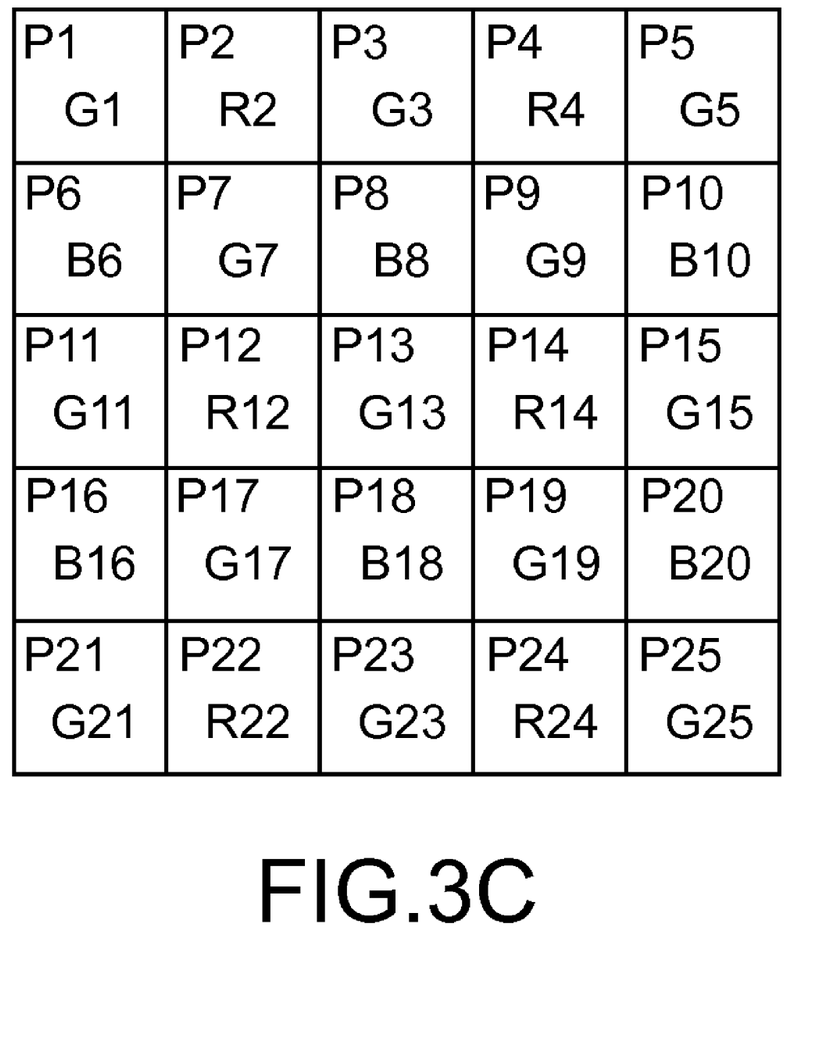
FIG. 3C is a schematic diagram illustrating a Bayer pattern with a green center pixel to be reconstructed with missing red and blue color data.

Hereinafter, examples are given with Bayer patterns as illustrated in FIGS. 3A~3C for understanding the color data reconstruction of the present invention.

Please refer to FIG. 3A, in which a Bayer pattern with 5×5 pixels labeled with serial numbers P1~P25 and centered on a red pixel P13 is illustrated. The references labeled in the same block as respective pixel serial numbers indicate respective color data captured for the pixels. For example, the center pixel P13 contains only red component R 13 while the pixels P7, P9, P19 and P17 around the center pixel P13 contain only blue components B7, B9, B19 and B17 and the pixels P8, P14, P18 and P12 around the center pixel P13 contain only green components G8, G14, G18 and G12, respectively. As shown, the G, B and R pixel numbers are substantially in a ratio of 2:1:1. Since the center pixel P13 does not contain blue component B13 and green component G13, these components B13 and G13 need be reconstructed. In general, color data of pixels of the Bayer pattern are reconstructed one by one. In other words, color data of pixels P1~P12 have been reconstructed before reconstructing the color data of the pixel P13.

In principle, the color data difference between two color components of a specified pixel will highly correlate to those of adjacent pixels in the same area. Therefore, the indices Cv and Ch can be calculated and the missing color data can be estimated according to such correlation, which will be described in detail by exemplifying the reconstruction of the color data G13 of the pixel P13.

For determining the vertical color data difference index Cv and horizontal color data difference index Ch, a first group of pixels adjacent to the pixel P13 are selected. In an embodiment of the present invention, the indices Cv and Ch are defined as follows:

$$Cv = e1*|GRv - GRavg| + \\ e2*|GBv - GBavg| + e3*|R3 - R13| + e4*|R23 - R13| + \\ e5*|G18 - G8| + e6*|G7 - G12| + e7*|G9 - G14|; \quad (1)$$

and $$Ch = e1*|GRh - GRavg| + e2*|GBh - GBavg| + \\ e3*|R11 - R13| + e4*|R15 - R13| + \\ e5*|G14 - G12| + e6*|G7 - G8| + e7*|G9 - G8|. \quad (2)$$

The parameters e1, e2, e3, e4, e5, e6 and e7 are preset coefficients. GRv is a difference between green color data and red color data of the pixel P13, which is estimated according to a formula (3) to be described later. GRh is a difference between green color data and red color data of the pixel P13, which is estimated according to a formula (4) to be described later. GBv is a difference between green color data and blue color data of the pixel P13, which is estimated according to a formula (5) to be described later. GBh is a difference between green color data and blue color data of the pixel P13, which is estimated according to a formula (6) to be described later. GRavg is a difference between averaged green color data and averaged red color data of the Bayer pattern, which is estimated according to a formula (7) to be described later. GBavg is a difference between averaged green color data and averaged blue color data of the Bayer pattern, which is estimated according to a formula (8) to be described later. R3, R11, R13, R15 and R23 are detected red color data of pixels P3, P11, P13, P15 and P23. G8, G12, G14 and G18 are detected green color data of pixels P8, P12, P14 and P18. G7 and G9 are previously estimated green color data of pixels P7 and P9.

More specifically, the differences GRv and GRh are defined as follows.

$$GRv=Gv-R13=(k1*((G8-R3)+(G18-R23))+k2*((G8-R13)+(G18-R13)))/k3 \quad (3), \text{ and}$$

$$GRh=Gh-R13=(k1*((G12-R11)+(G14-R15))+k2*((G12-R13)+(G14-R13)))/k3 \quad (4).$$

Gv and Gh are vertically and horizontally estimated color data G13 of the pixel 13, respectively. k1, k2 and k3 are preset coefficients. G8, G12, G14 and G18 are green color data of pixels P8, P12, P14 and P18. R3, R11, R15 and R23 are red color data of pixels P3, P11, P15 and P23.

Likewise, the differences GBv and GBh are defined as follows.

$$\begin{aligned}GBv &= -BGv \\ &= -(Bv - Gv) \\ &= -((k4*(B7 - G12) + k5*(B17 - G12) + \\ &\quad k6*(B9 - G14) + k7*(B19 - G14))/k8);\end{aligned} \quad (5)$$

and $$\begin{aligned}GBh &= -BGh \\ &= -(Bh - Gh) \\ &= -((k4*(B7 - G8) + k5*(B17 - G18) + \\ &\quad k6*(B9 - G8) + k7*(B19 - G18))/k8).\end{aligned} \quad (6)$$

Bv and Bh are vertically and horizontally estimated color data B13 of the pixel 13, respectively. k4, k5, k6, k7 and k8 are preset coefficients. B7, B9, B17 and B19 are blue color data of pixels P7, P9, P17 and P19. G8, G12, G14 and G18 are green color data of pixels P8, P12, P14 and P18.

More specifically, the differences GRavg and GBavg are averaged green-red color difference and averaged green-blue color difference of the Bayer pattern, which are estimated according to green color data of 18 pixels, red color data of 14 pixels, and blue color data of 12 pixels.

$$GRavg = Gavg - Ravg, \quad (7)$$

and $$GBavg = Gavg - Bavg, \quad (8)$$

wherein $$\begin{aligned}Gavg = (a1*(G8 + G12 + G14 + G18) + \\ a2*(G2 + G4 + G6 + G10 + G16 + G20 + G22 + G24) + \\ a3*(G1 + G3 + G5 + G7 + G9 + G11))/a4;\end{aligned} \quad (9)$$

$$\begin{aligned}Ravg = (a5*R13 + a6*(R1 + R5 + R21 + R25) + \\ a7*(R3 + R11 + R15 + R23) + \\ a8*(R2 + R6) + a9*(R4 + R8 + R12))/a10;\end{aligned} \quad (10)$$

and $$\begin{aligned}Bavg = (a11*(B7 + B9 + B17 + B19) + a12*(B2 + B4 + B6 + B10) + \\ a13*(B3 + B8) + a14*(B1 + B5))/a15.\end{aligned} \quad (11)$$

a1~a15 are preset coefficients. G1~G12, G14, G16, G18, G20, G22 and G24 are detected or estimated green color data of pixels P1~P12, P14, P16, P18, P20, P22 and P24. R1~R6, R8, R11~R13, R15, R21, R23 and R25 are detected or estimated red color data of pixels P1~P6, P8, P11~P13, P15, P21, P23 and P25. B1~B10, B17 and B19 are detected or estimated blue color data of pixels P1~P19, P17 and P19.

After the vertical color data difference index Cv and horizontal color data difference index Ch are realized, the indices Cv and Ch are compared with each other for determining which pixels to be used for reconstructing the color data of the pixel P13. The following three possible cases will be involved:

If Cv−Ch<T, where T is a preset threshold equal to or greater than zero, the green color data G13 of the pixel P13 is equal to Gvs;

if Cv−Ch>T, the green color data G13 of the pixel P13 is equal to Ghs; and if Cv−Ch=T, the green color data G13 of the pixel P13 is equal to G′, wherein $$Gvs=s1*R13+s2*(s3*((G8-R3)+(G18-R23))+s4*((G8-R13)+(G18-R13)))/s5+s6*Bv+s7*GBavg \quad (12);$$

$$Ghs=s1*R13+s2*(s3*((G12-R11)+(G14-R15))+s4*((G12-R13)+(G14-R13)))/s5+s6*Bh+s7*GBavg \quad (13); \text{ and}$$

$$G'=(G8+G12+G18+G14)/4 \quad (14).$$

s1~s7 are preset coefficients. (G8−R3), (G18−R23), (G8−R13) and (G18−R13) are green-red color differences between vertically adjacent pixels. (G12−R11), (G14−R15), (G12−R13) and (G14−R13) are green-red color differences between horizontally adjacent pixels. GBavg has been defined previously in equation (8). Bv and Bh can be calculated according to previously presented equations (5) and (6) and thus obtained as follows:

$$Bv=Gv-GBv=Gv+(k4*(B7-G12)+k5*(B17-G12)+k6*(B9-G14)+k7*(B19-G14))/k8 \quad (15); \text{ and}$$

$$Bh=Gh-GBh=Gh+(k4*(B7-G8)+k5*(B17-G18)+k6*(B9-G8)+k7*(B19-G18))/k8 \quad (16),$$

where Gv and Gh can be calculated according to previously presented equations (3) and (4) and thus obtained as follows:

$$Gv=GRv+R13=R13+(k1*((G8-R3)+(G18-R23))+k2*((G8-R13)+(G18-R13)))/k3 \quad (17), \text{ and}$$

$$Gh=GRh+R13=(k1*((G12-R11)+(G14-R15))+k2*((G12-R13)+(G14-R13)))/k3 \quad (18).$$

After the green color data G13 of the pixel P13 is reconstructed, the missing blue color data B13 can be reconstructed according to the following formula:

$$\begin{aligned}B13=G13+(f1*((B7-G7)+(B9-G9)+(B17-G17)+ \\ (B19-G19))+f2*((B8-G8)+(B14-G14)+(B18- \\ G18)+(B12-G12)))/f3\end{aligned} \quad (19).$$

f1, f2 and f3 are preset coefficients. B7, B8, B9, B12, B14, B17, B18 and B19 are detected or estimated blue color data of pixels P7, P8, P9, P12, P14, P17, P18 and P19. G7, G8, G9, G12, G14, G17, G18 and G19 are detected or estimated blue color data of pixels P7, P8, P9, P12, P14, P17, P18 and P19.

In this way, the missing blue color data and green color data of the center pixel P13 of the Bayer pattern of FIG. 3A with captured red color data R13 can be reconstructed in a precise manner.

Similar interpolation algorithms can be applied to a 5×5 Bayer pattern of FIG. 3B, wherein the center pixel P13 contains blue color data G13, for reconstructing missing green and red color data G13 and R13.

On the other hand, missing blue and red color data B13 and R13 of the pixel P13 of a 5×5 Bayer pattern with known green color data G13 as illustrated in FIG. 3C can be reconstructed by the following equations:

$$R13=G13+(w1*((R12-G12)+(R14-G14))+w2*((R8-G8)+(R18-G18)))/w3 \quad (20); \text{ and}$$

$$B13=G13+(w1*((B8-G8)+(B18-G18))+w2*((B12-G12)+(B14-G14)))/w3 \quad (21).$$

w1, w2 and w3 are preset coefficients. R8, R12, R14 and R18 are detected or estimated red color data of pixels P8, P12, P14 and P18. G8, G12, G14 and G18 are detected or estimated green color data of pixels P8, P12, P14 and P18. B8, B12, B14 and B18 are detected or estimated blue color data of pixels P8, P12, P14 and P18.

The above-mentioned coefficients k1~k8, a1~a15, e1~e7, s1~s7, f1~f3 and w1~w3 can be determined according to the simulation utilizing a plurality of reference images. For example, an optimal set of coefficients can be obtained by calculating the minimum root mean square errors.

In the above example, the first group of pixels for determining the vertical color data difference index Cv and horizontal color data difference index Ch include the pixels at the same row (e.g. P11, P12, P14, P15) and the same column (e.g. P3, P8, P18, P23) as the pixel to be reconstructed, and other pixels (e.g. P7 and P9). When Cv−Ch<T, the second group of pixels including the pixels at the same column as the pixel to be reconstructed, e.g. P3, P8, P13, P18 and P23, and other pixels, e.g. P7, P9, P12, P14, P17 and P19, are used for determining the missing color data. On the other hand, when Cv−Ch>T, the third group of pixels including the pixels at the same row as the pixel to be reconstructed, e.g. P11, P12, P13, P14 and P15, and other pixels, e.g. P7, P8, P9, P17, P18 and P19, are used for determining the missing color data. Otherwise, when Cv−Ch=T, the fourth group of pixels including the pixels vertically and horizontally next to the pixel to be reconstructed, e.g. P8, P12, P14 and P18, are used for determining the missing color data.

Figure 4:
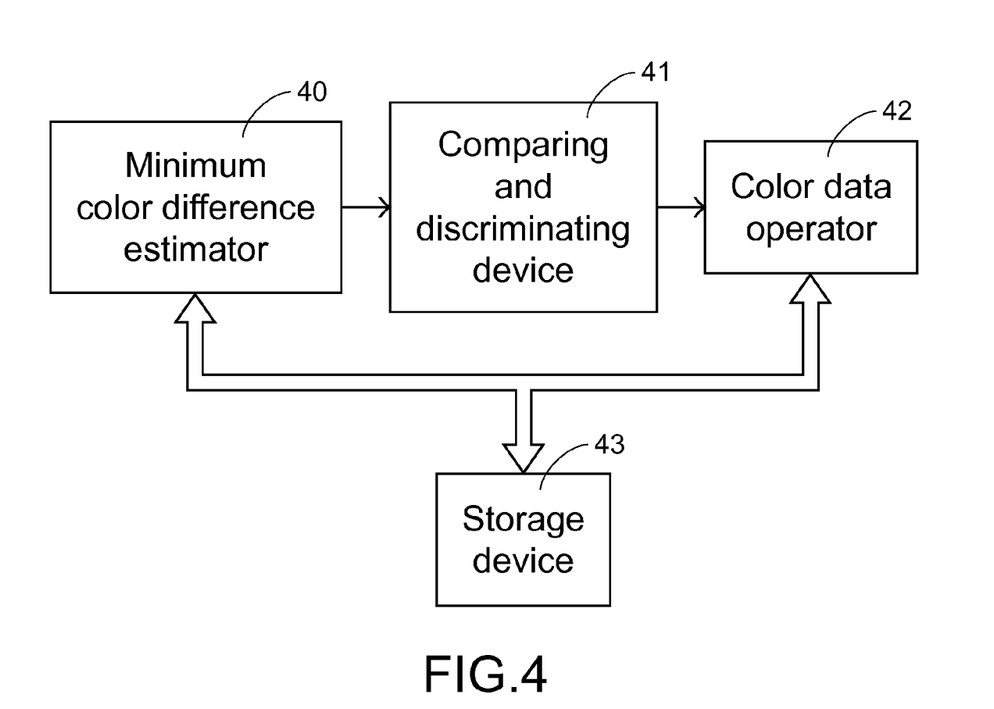
FIG. 4 is a functional block diagram illustrating a device for reconstructing missing color data according to an embodiment of the present invention.

For implementing the reconstructing method described above, a color data reconstructing device is provided according to the present invention. Please refer to FIG. 4. The color data reconstructing device includes a minimum color difference estimator 40, a comparing and discriminating device 41, a color data operator 42 and a storage device 43. The minimum color difference estimator 40 reads color data of specified pixels to calculate a vertical color data difference index Cv and a horizontal color data difference index Ch for determining which interpolation algorithm is to be applied. The comparing and discriminating device 41 determines whether the difference of the indices Cv and Ch is greater than a threshold T, and selects a suitable interpolation algorithm and associated pixels to be executed, for example, by issuing a first signal indicative of Cv−Ch<T, a second signal indicative of Cv−Ch>T and a third signal indicative of Cv−Ch=T. The color data operator 42 then reads and operates the color data of the selected pixels from the storage device 43 to obtain an estimated color data in response to one of the first, second and third signals. The estimated color data is then written into the storage device 43 to serve as the missing color data.

Since the present invention evaluates the minimum color difference and then utilizes different interpolation algorithms that involve difference pixels to reconstruct color data, the precision of the reconstructed color data can be improved. Moreover, the blurred edge problem can be significantly ameliorated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for reconstructing a color data of a specified pixel, comprising:

measuring a vertical color data difference index Cv and a horizontal color data difference index Ch according to color data of a first group of pixels included in a pixel array, wherein the first group of pixels include a plurality of pixels vertically adjacent to the specified pixel, a plurality of pixels horizontally adjacent to the specified pixel, and at least one other pixel non-vertical and non-horizontal to the specified pixel; and executing one of a plurality of preset interpolation algorithms, which is selected according to a comparing result of the vertical color data difference index Cv and horizontal color data difference index Ch, thereby obtaining a reconstructed color data;

wherein the specified pixel is one of the pixels included in a Bayer pattern, the specified pixel contains first-component color data while missing second-component color data and third-component color data, pixels vertically and horizontally next to the specified pixel contain the second-component color data, and pixels diagonally next to the specified pixel contain the third-component color data; the reconstructed color data is the second-component color data;

wherein the pixel array includes 5×5 pixels numbered as P1~P25 row after row, the specific pixel is pixel P13, and the horizontal color data difference index Ch is obtained according to a formula of:

$$Ch=e1*|GRh-GRavg|+e2*|GBh-GBavg|+e3*|R11-R13|+e4*|R15-R13|+e5*|G14-G12|+e6*|G7-G8|+e7*|G9-G8|$$

wherein e1, e2, e3, e4, e5, e6 and e7 are preset coefficients; GRh is a difference between an estimated value of the second-component color data and a detected value of the first-component color data of the specified pixel; GBh is a difference between an estimated value of the second-component color data and an estimated value of the third-component color data of the specified pixel; GRavg is a difference between an averaged value of the second-component color data and an averaged value of the first-component color data of the pixel array; GBavg is a difference between an averaged value of the second-component color data and an averaged value of the third-component color data of the pixel array; R11, R13 and R15 are detected values of the first-component color data of pixels P11, P13 and P15; G8, G12 and G14 are detected values of the second-component color data of pixels P8, P12 and P14; and G7 and G9 are estimated values of the second-component color data of pixels P7 and P9.

2. The method according to claim 1 wherein the first-component color data, the second-component color data and the third-component color data are red color data (R), green color data (G) and blue color data (B), respectively.

3. The method according to claim 1 wherein the first-component color data, the second-component color data and the third-component color data are blue color data (B), green color data (G) and red color data (R), respectively.

4. The method according to claim 1 wherein the pixel array includes 5×5 pixels numbered as P1~P25 row after row, the specific pixel is pixel P13, and the vertical color data difference index Cv is obtained according to a formula of:

$$Cv=e1*|GRv-GRavg|+e2*|GBv-GBavg|+e3*|R3-R13|+e4*|R23-R13|+e5*|G18-G8|+e6*|G7-G12|+e7*|G9-G14|$$

wherein e1, e2, e3, e4, e5, e6 and e7 are preset coefficients; GRv is a difference between an estimated value of the second-component color data and a detected value of the first-component color data of the specified pixel; GBv is a difference between an estimated value of the second-component color data and an estimated value of the third-component color data of the specified pixel; GRavg is a difference between an averaged value of the second-component color data and an averaged value of the first-component color data of the pixel array; GBavg is a difference between an averaged value of the second-component color data and an averaged value of the third-component color data of the pixel array; R3, R11, R13, R15 and R23 are detected values of first-component color data of pixels P3, P11, P13, P15 and P23; and G7, G8, G9, G12, G14 and G18 are second-component color data of pixels P7, P8, P9, P12, P14 and P18.

5. The method according to claim 1 wherein the pixel array includes 5×5 pixels numbered as P1~P25 row after row, the specific pixel is pixel P13, and after the second-component color data G13 of the specified pixel P13 is reconstructed, the method further comprises a step of reconstructing the third-component color data B13 of the specified pixel P13 by a formula of:

$$B13=G13+(f1*((B7-G7)+(B9-G9)+(B17-G17)+(B19-G19))+f2*((B8-G8)+(B14-G14)+(B18-G18)+(B12-G12)))/f3,$$

where f1, f2 and f3 are preset coefficients; B7, B8, B9, B12, B14, B17, B18 and B19 are detected or estimated blue color data of pixels P7, P8, P9, P12, P14, P17, P18 and P19; and G7, G8, G9, G12, G14, G17, G18 and G19 are detected or estimated blue color data of pixels P7, P8, P9, P12, P14, P17, P18 and P19.

6. The method according to claim 1 wherein a first interpolation algorithm is executed with a second group of pixels of the pixel array if Cv−Ch<T, where T is a preset threshold equal to or greater than zero, a second interpolation algorithm is executed with a third group of pixels of the pixel array if Cv−Ch>T, and a third interpolation algorithm is executed with a fourth group of pixels of the pixel array if Cv−Ch=T.

7. The method according to claim 6 wherein the second group of pixels include all the pixels in the same column of the pixel array as the specified pixel and at least one other pixel.

8. The method according to claim 6 wherein the third group of pixels include all the pixels in the same row of the pixel array as the specified pixel and at least one other pixel.

9. The method according to claim 6 wherein the fourth group of pixels consist of pixels horizontally and vertically next to the specified pixel.

10. The method according to claim 6 wherein the first interpolation algorithm, the second interpolation algorithm and the third interpolation algorithm are based on minimum color difference theory.

11. The method according to claim 6 wherein the pixel array includes 5×5 pixels numbered as P1~P25 row after row, the specific pixel is pixel P13, and according to the first interpolation algorithm, the reconstructed color data of the specified pixel is Gvs:

$$Gvs=s1*R13+s2*(s3*((G8-R3)+(G18-R23))+s4*((G8-R13)+(G18-R13)))/s5+s6*Bv+s7*GBavg$$

wherein s1~s7 are preset coefficients; G8 and G18 are detected values of the second-component color data of pixels P8 and P18; R3, R13 and R23 are detected values of the first-component color data of pixels P3, P13 and P23; Bv is an estimated value of the third-component color data of the specified pixel; and GBavg is a difference between an averaged value of the second-component color data and an averaged value of the third-component color data of the pixel array.

12. The method according to claim 6 wherein the pixel array includes 5×5 pixels numbered as P1~P25 row after row, the specific pixel is pixel P13, and according to the second interpolation algorithm, the reconstructed color data of the specified pixel is Ghs:

$$Ghs=s1*R13+s2*(s3*((G12-R11)+(G14-R15))+s4*((G12-R13)+(G14-R13)))/s5+s6*Bh+s7*GBavg$$

wherein s1~s7 are preset coefficients; G12 and G14 are detected values of the second-component color data of pixels P12 and P14; R11, R13 and R15 are detected values of the first-component color data of pixels P11, P13 and P15; Bh is an estimated value of the third-component color data of the specified pixel; and GBavg is a difference between an averaged value of the second-component color data and an averaged value of the third-component color data of the pixel array.

13. The method according to claim 6 wherein the pixel array includes 5×5 pixels numbered as P1~P25 row after row, the specific pixel is pixel P13, and according to the third interpolation algorithm, the reconstructed color data of the specified pixel is G':

$$G'=(G8+G12+G18+G14)/4$$

wherein G8, G12, G14 and G18 are detected values of the second-component color data of pixels P8, P12, P14 and P18.

14. A device for reconstructing a color data of a specified pixel included in a Bayer pattern, comprising:
a minimum color difference estimator for measuring a vertical color data difference index Cv and a horizontal color data difference index Ch specific to the specified pixel according to color data of a specified group of pixels included in the Bayer pattern;
a comparing and discriminating device coupled to the minimum color difference estimator for comparing the vertical color data difference index Cv with the horizontal color data difference index Ch, and selecting one of a plurality of preset interpolation algorithms to be executed according to the comparing result; and
a color data operator coupled to the comparing and discriminating device for executing the selected interpolation algorithm with color data of a selected group of pixels included in the Bayer pattern, thereby obtaining a reconstructed color data of the specified pixel;
wherein the specified pixel is one of the pixels included in a Bayer pattern, the specified pixel contains first-component color data while missing second-component color data and third-component color data, pixels vertically and horizontally next to the specified pixel contain the second-component color data, and pixels diagonally next to the specified pixel contain the third-component color data; the reconstructed color data is the second-component color data;
wherein the pixel array includes 5×5 pixels numbered as P1~P25 row after row, the specific pixel is pixel P13, and the horizontal color data difference index Ch is obtained according to a formula of:

$$Ch=e1*|GRh-GRavg|+e2*|GBh-GBavg|+e3*|R11-R13|+e4*|R15-R13|+e5*|G14-G12|+e6*|G7-G8|+e7*|G9-G8|$$

wherein e1, e2, e3, e4, e5, e6 and e7 are preset coefficients; GRh is a difference between an estimated value of the second-component color data and a detected value of the first-component color data of the specified pixel; GBh is a difference between an estimated value of the second-component color data and an estimated value of the third-component color data of the specified pixel; GRavg is a difference between an averaged value of the second-component color data and an averaged value of the first-component color data of the pixel array; GBavg is a difference between an averaged value of the second-component color data and an averaged value of the third-component color data of the pixel array; R11, R13 and R15 are detected values of the first-component color data of pixels P11, P13 and P15; G8, G12 and G14 are detected values of the second-component color data of pixels P8, P12 and P14; and G7 and G9 are estimated values of the second-component color data of pixels P7 and P9.

15. The device according to claim 14, further comprising a storage device coupled to the minimum color difference estimator and the color data operator for storing therein the Bayer pattern and being written thereinto the reconstructed color data of the specified pixel.

16. The device according to claim 14 wherein the comparing and discriminating device issues a first signal indicative of Cv−Ch<T, a second signal indicative of Cv−Ch>T or a third signal indicative of Cv−Ch=T to the color data operator to have a first interpolation algorithm, a second interpolation algorithm or a third interpolation algorithm executed, respectively.

17. The device according to claim 14 wherein the specified group of pixels include a plurality of pixels vertically adjacent to the specified pixel, a plurality of pixels horizontally adjacent to the specified pixel, and at least one other pixel non-vertical and non-horizontal to the specified pixel.

* * * * *